United States Patent [19]

Jimenez

[11] Patent Number: 4,757,796

[45] Date of Patent: Jul. 19, 1988

[54] CARBURETOR/MIXING CHAMBER AND DUAL THROTTLE CONTROL AND COLD STARTING APPARATUS FOR GASOLINE ENGINE

[76] Inventor: Miguel A. Jimenez, 419 Sixth St., Douglas, Ariz. 85607

[21] Appl. No.: 65,413

[22] Filed: Jun. 22, 1987

Related U.S. Application Data

[63] Continuation-in-part of Ser. No. 814,647, Dec. 30, 1985, Pat. No. 4,674,465, which is a continuation-in-part of Ser. No. 588,910, Mar. 12, 1984, Pat. No. 4,562,820.

[51] Int. Cl.⁴ .......................................... F02M 13/04
[52] U.S. Cl. ................................... 123/576; 123/577; 123/336
[58] Field of Search ............... 123/522, 523, 525, 527, 123/575, 576, 577, 578, 581, 582, 544, 583, 584, 336

[56] References Cited

U.S. PATENT DOCUMENTS

| | | | |
|---|---|---|---|
| 1,488,550 | 4/1924 | Overaasen | 123/127 |
| 1,954,968 | 4/1934 | Waters | 123/121 |
| 2,075,330 | 3/1937 | Angell, Jr. et al. | 123/127 |
| 2,258,486 | 10/1941 | Firth et al. | 48/107 |
| 2,319,773 | 5/1943 | Ericson | 123/119 |
| 2,326,205 | 8/1943 | Dowdell | 261/16 |
| 2,361,250 | 10/1944 | Vincent | 123/127 |
| 2,391,933 | 1/1946 | Wharam et al. | 123/127 |
| 2,446,034 | 7/1948 | Williams | 123/127 |
| 2,575,210 | 11/1951 | Ericson | 123/127 |
| 2,643,647 | 6/1953 | Meyer et al. | 123/127 |
| 3,223,390 | 12/1965 | Bunze | 261/18 |
| 3,641,767 | 2/1972 | Kraus et al. | 60/30 |
| 3,646,924 | 3/1972 | Newkirk et al. | 123/120 |
| 3,943,900 | 3/1976 | Primrose | 123/124 |
| 4,056,087 | 11/1977 | Boyce | 123/127 |
| 4,062,334 | 12/1977 | Toda et al. | 123/122 |
| 4,083,343 | 4/1978 | Paton, III | 123/124 |
| 4,137,875 | 2/1979 | Medina | 123/119 |
| 4,167,166 | 9/1979 | Varner et al. | 123/122 |
| 4,175,525 | 11/1979 | Johnson | 123/134 |
| 4,249,503 | 2/1981 | Noguchi et al. | 123/568 |
| 4,421,087 | 12/1983 | Schuurman | 123/576 |
| 4,606,319 | 8/1986 | Silva | 123/577 |
| 4,674,465 | 6/1987 | Jimenez | 123/577 |

Primary Examiner—Ronald B. Cox
Attorney, Agent, or Firm—Cahill, Sutton & Thomas

[57] ABSTRACT

Apparatus including a mixing chamber is installed between a standard carburetor base and the intake manifold of a gasoline engine. The mixing chamber includes an air inlet port for admitting a controlled amount of outside air into the mixing chamber and a gasoline vapor port for admitting gasoline vaporized externally of the carburetor into the mixing chamber, a carburetor inlet port for receiving a mixture of air and partially vaporized gasoline from the carburetor throat, and an outlet port through which a mixture of all the gases exhausts into the intake manifold. The carburetor includes a first throttle valve for controlling the air amount and partially vaporized gasoline passing into the mixing chamber. A second throttle valve controls the amount of mixed gas drawn through the mixing chamber outlet port into the intake manifold. A linkage connected to the automobile accelerator cable opens the second throttle in response to initial accelerator displacement. As the engine load increases and the accelerator is depressed further, the second throttle valve opens further and the linkage causes the first throttle valve to partially open, admitting a normal air charge and partially vaporized gasoline into the mixing chamber along with the air and gasoline vapor admitted through the two ports thereof. During cold start, while an automatic choke is closed, the first throttle valve opens. The linkage forces the second throttle valve open, and a rich mixture suitable for cold engine conditions passes through the mixing chamber into the intake manifold.

3 Claims, 3 Drawing Sheets

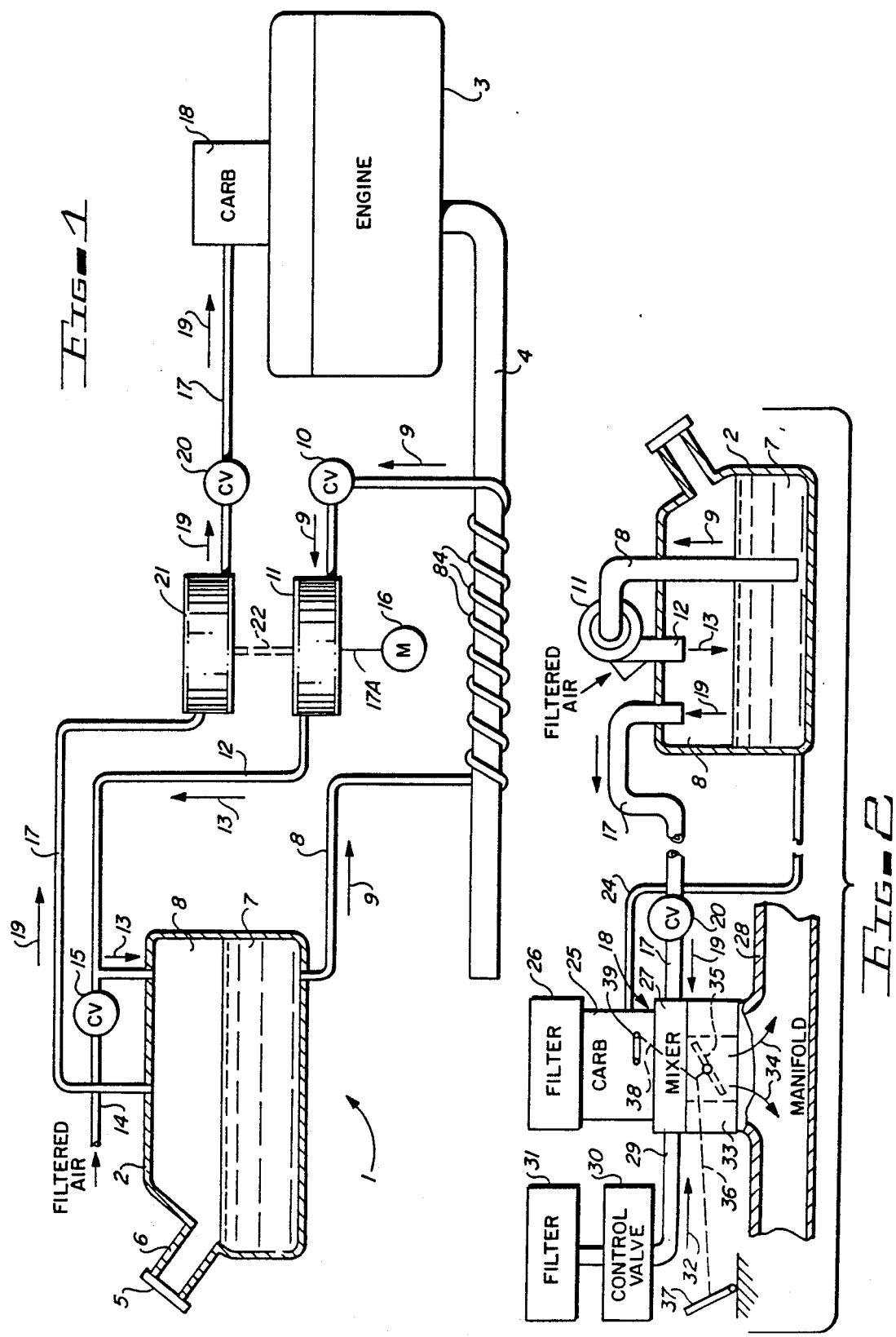

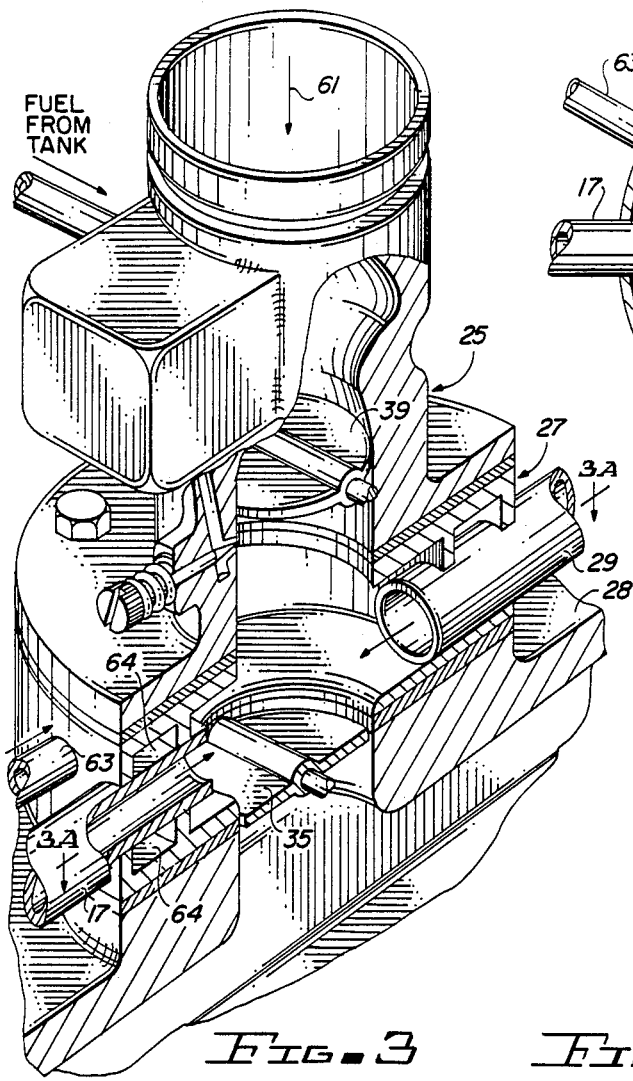
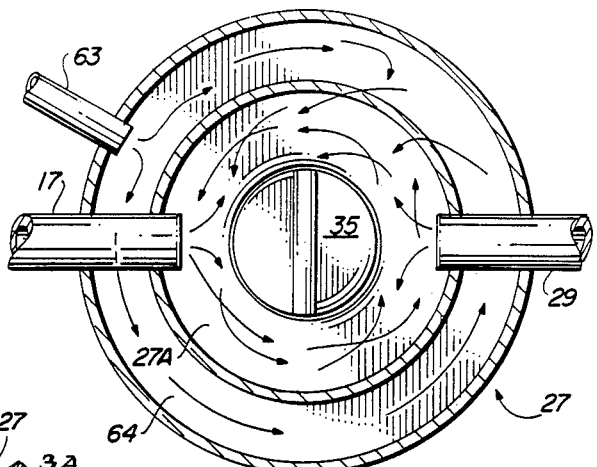
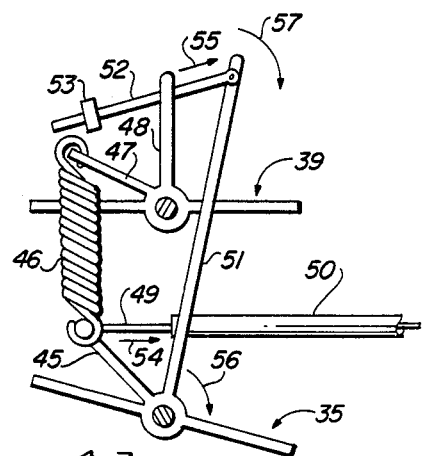
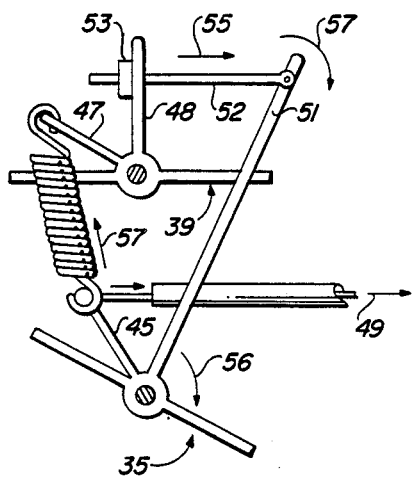
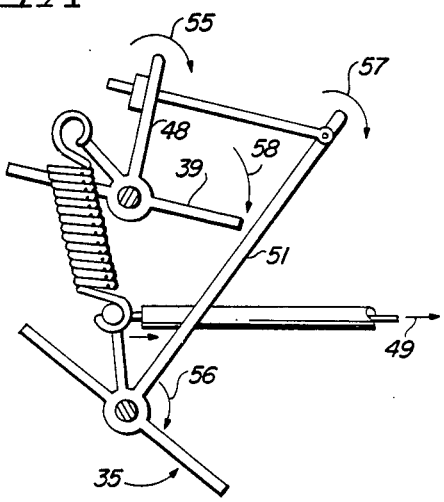
Fig-3
Fig-3A
Fig-4A
Fig-4B
Fig-4C

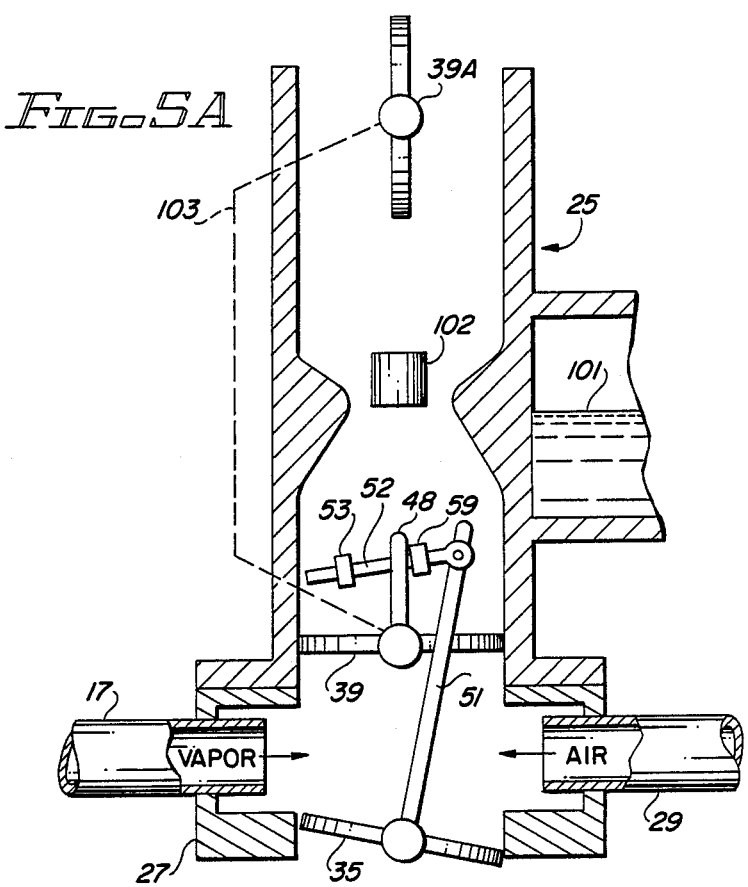
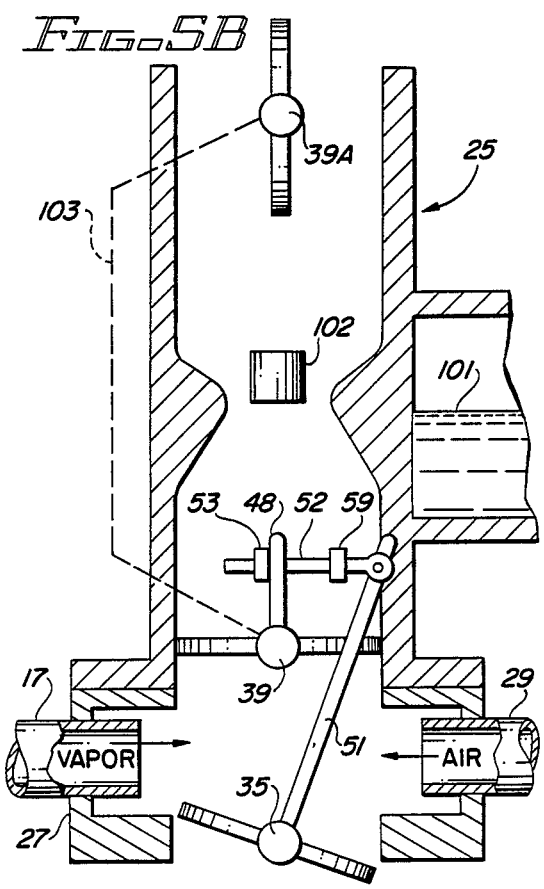
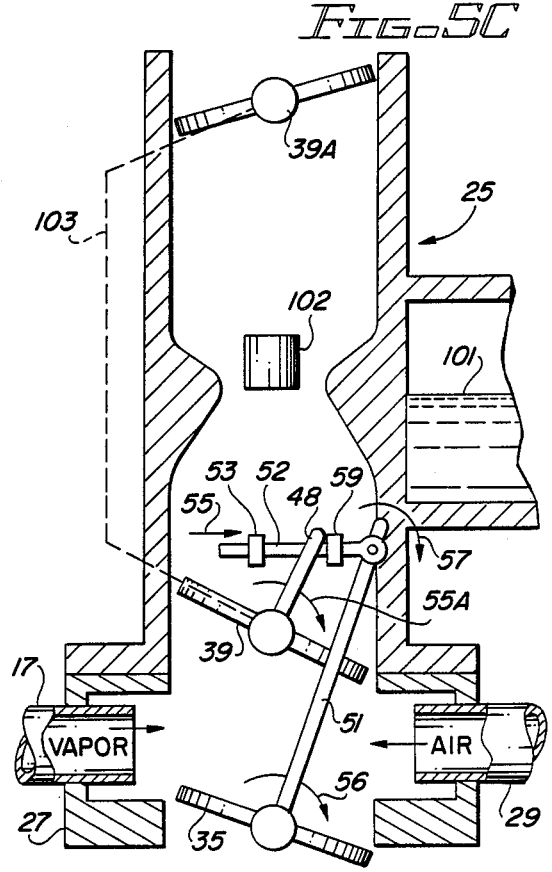

CARBURETOR/MIXING CHAMBER AND DUAL THROTTLE CONTROL AND COLD STARTING APPARATUS FOR GASOLINE ENGINE

CROSS-REFERENCE TO RELATED APPLICATION

This application is a continuation-in-part of my copending application "CARBURATOR/MIXING CHAMBER AND DUAL THROTTLE CONTROL APPARATUS FOR GASOLINE ENGINE", Ser. No. 814,647, filed Dec. 30, 1985, now U.S. Pat. No. 4,674,465, which is a continuation-in-part of Ser. No. 588,910, filed 3/12/84, now U.S. Pat. No. 4,562,820, issued Jan. 7, 1986, and entitled "CAVITATION-PRODUCING CARBURATION APPARATUS AND METHOD".

BACKGROUND OF THE INVENTION

A number of carburation devices are known which provide various teachings for improving the fuel efficiency of internal combustion gasoline engines. Conventional carburation devices produce a combustible fuel and air mixture by causing air to be drawn through a venturi into which liquid gasoline is fed. However, the fuel and air mixture, which includes an air stream containing a mist of small liquid gasoline droplets and gasoline vapor resulting from evaporation of the droplets, is not an ideal mixture. It has long been known that the efficiency of the engine is partially dependent upon the degree to which the liquid gasoline is vaporized. The lack of complete vaporization by conventional carburetors leads to disadvantages, such as carbon build-up in the engine due to too rich of an air-fuel mixture being burned in certain engine cylinders and too lean of a fuel-air proportion at other points resulting from inertia of unvaporized droplets of liquid gasoline that in turn causes centrifugal separation of some of the liquid droplets from the air and vapor flow at bends within the intake manifold. Hot air injection into the intake manifold to improve vaporization, and thereby improve combustion and hence fuel efficiency, and also to reduce pollutants has been utilized, but this involves a decrease in the thermodynamic efficiency of the engine. U.S. Pat. Nos. 3,943,900, 4,137,875, and 4,167,166 disclose mixing chambers positioned between a conventional carburetor and the engine's intake manifold to mix additional air with the fuel-air mixture produced by the carburetor to accomplish increased vaporization. U.S. Pat. Nos. 4,062,334, 2,446,034, 2,351,250, and 2,075,330 disclose multiple, sequential carburation systems to improve vaporization of the liquid gasoline. U.S. Pat. No. 4,175,525 discloses a chamber which vaporizes liquid gasoline by bubbling air through gasoline, producing a gasoline vapor in a container, drawing the gasoline vapor into the region between the throttle plate and the intake manifold, and providing a check valve to prevent explosions due to backfiring. The device disclosed draws only several ounces of liquid gasoline from each gallon of gasoline consumed by the carburetor, vaporizes it by bubbling air through the several ounce quantity, and injects fully vaporized gasoline downstream from the main carburetor. This is alleged to allow the main carburetor to be adjusted to produce a leaner mixture. However, the air-fuel mixture produced by the venturi action of the carburetor nevertheless includes a substantial amount of unvaporized liquid gasoline in the form of droplets which cause the above-mentioned problems.

Thus, there remains an unmet need for an improved carburation system which greatly reduces the amount of unvaporized gasoline in the form of a gasoline mist entering the intake manifold of an engine.

SUMMARY OF THE INVENTION

Accordingly, it is an object of the invention to provide an apparatus and technique for efficiently vaporizing liquid gasoline to improve the efficiency of an internal combustion engine and reduce the level of pollutants emitted by the engine.

It is another object of the invention to provide an improved carburation system for a gasoline engine which provides essentially completely vaporized gasoline in a suitable air-to-fuel ratio for engine operation under low and medium engine load conditions, and is also able to provide adequate fuel and air to allow operation of the engine under high load conditions.

It is another object of the invention to provide an improved carburation system of the type described adapted to also provide a suitably rich fuel and air mixture to allow efficient engine starting and engine running under cold engine conditions.

It is another object of the invention to provide such an apparatus which is easily retrofitted to a conventional carburetion system of an automobile engine.

Briefly described, and in accordance with one embodiment thereof, the invention provides a carburation system including an apparatus for efficiently vaporizing a relatively large quantity of liquid gasoline adequate for low and medium load operation of an engine, a mixing chamber having a carburetor inlet port for receiving a mixture of air and partially vaporized gasoline from a conventional carburetor of the engine, an inlet port for receiving controlled amounts of complete vaporized gasoline vapor from the vaporizing apparatus, an inlet port for receiving controlled amounts of outside air for mixture in a predetermined ratio with the completely vaporized gasoline received from the other inlet port, in order to promote thorough mixing of the gasoline vapors and the air drawn in through the outside air inlet port, and also includes an outlet connected through a first throttle valve to the inlet of an intake manifold of the engine. The conventional carburetor includes a second throttle valve. A linkage connecting the accelerator cable of the automobile to the first throttle valve allows the first throttle valve to be opened to a predetermined degree adequate for low and medium engine load conditions while the second throttle valve remains substantially closed, so that only relatively minute amounts of the air-fuel mixture passing through the conventional carburetor reach the mixing chamber. Low and medium engine load conditions result in consumption of essentially completely vaporized gasoline from the vapor inlet port. When the accelerator is actuated to produce high engine loading conditions, the linkage further opens the first throttle valve, and also opens the second throttle valve, allowing large, controlled amounts of air and partially vaporized gasoline to be drawn through the conventional carburetor in the normal fashion, adding this fuel-air mixture to the mixture already in the mixing chamber. During cold starting conditions, while an automatic choke is closed, the first throttle valve opens. The linkage forces the second throttle valve open, and a rich mixture suitable for cold engine conditions pass through the mixing chamber into the intake manifold.

BRIEF DESCRIPTION OF THE DRAWINGS

FIG. 1 is a diagram of a centrifugal cavitation vaporizing system useful in practicing the present invention.

FIG. 2 is another diagram useful in further explaining the operation of the system of FIG. 1 and also discloses another embodiment of the invention.

FIG. 3 is a diagram illustrating the carburetor, mixing chamber and two throttle valves of the invention in more detail than shown in FIG. 2.

FIG. 3A is a section view taken along section lines 3—3 of FIG. 3.

FIGS. 4A–4C are a sequence of diagrams illustrating operation of a linkage coupling the accelerator to the two throttle valves shown in FIG. 3.

FIGS. 5A–5C are sequence of diagrams useful in explaining operation of the linkage under cold engine starting and cold engine running conditions.

DESCRIPTION OF THE INVENTION

Referring now to FIG. 1, a presently preferred embodiment of the invention, designated by reference numeral 1, will be described.

Gasoline tank 2 is the fuel tank of a typical automobile, and engine 3 is the gasoline engine of that automobile. Engine 3 has an exhaust pipe 4.

A cap 5 seals the fuel inlet 6 of gasoline tank 2. Gasoline tank 2 is only partially filled with liquid gasoline 7, so that there is a large empty region 8 above the surface of the liquid gasoline 7 in tank 2.

In accordance with the present invention, a fuel line or tube 8 communicates with the lower portion of tank 7, and cold, liquid gasoline moves through tube 8 in the direction of arrow 9. Preferably, tube 8 is composed of copper tubing. A typical size for the copper tubing would be one-half in diameter. The cold, liquid gasoline flowing in tube 8 can be preheated while it is in tube 8, in accordance with one embodiment of the invention. If this is done, one way of preheating the fuel is to use the heat from exhaust pipe 4 by wrapping tube 8 around exhaust pipe 4, as indicated by reference numeral 8A. The number of turns of the tubing 8 around exhaust pipe 4 depends on how close to the exhaust manifold the turns are. The preheated liquid gasoline then flows through a check valve 10 before passing into an inlet of centrifugal pump 11. Check valve 10 can be any common check valve of the kind that can be purchased at most hardware stores.

Centrifugal pumps can be used, as long as their impellers are driven fast enough to cause cavitation. It has an internal rotor or impeller (not shown) which subjects the preheated gasoline to very high acceleration. This acceleration produces cavitation. Cavitation in pumps is ordinarily highly undesirable, as it leads to loss in pumping efficiency. However, in accordance with the present invention, the cavitation which is formed with the liquid gasoline undergoes a sufficient amount of acceleration to cause "voids" to form in the liquid. The near vacuum condition in these voids causes very rapid vaporization of the liquid gasoline, especially if it is preheated. More specifically, preheating of the gasoline increases the rate of vaporization of the liquid gasoline in these voids, so that, in essence, it "boils" into them at a very rapid rate. Therefore, in accordance with the present invention, the cavitation process is an advantage, rather than a disadvantage, as is usually the case when cavitation occurs in a pump.

Not all of the liquid gasoline injected into centrifugal pump 11 is vaporized, however. A "foam" consisting of a larger amount of vaporized gasoline and also a significant amount of liquid usually moves through tube 12 in the direction of arrows 13 and flows back into the upper empty region 8 of fuel tank 7. The liquid portion of the foam quickly recombines with the liquid gasoline 7 in the lower portion of tank 2, but the region 8 becomes filled with a large supply of vaporized gasoline, which is ideal for combustion in the pistons of engine 3 when mixed with an appropriate amount of fresh air.

In some instances, it is necessary for air to be drawn into the upper region 8 of tank 2 through tube 14, for example, to prevent a vacuum condition from occurring in tank region 8 under certain conditions. A check valve 15 is provided to prevent any of the gasoline vapor foam in tube 12 from passing out through tube 14.

The impeller of the centrifugal pump 11 can be operated by an electric motor 16, mechanically connected to the impeller by a mechanical means designated by reference numeral 17. The speed of motor 16 can be controlled to produce the desired level of cavitation in centrifugal pump 11.

Further in accordance with the present invention, a tube 17 leads from upper region 8 of the tank to a suitable carburation device 18 in the direction indicated by arrows 19. This vaporized gasoline moving through tube 17 passes through a one-way check valve 20, which can be easily constructed or readily obtained at hardware stores. This check valve is needed to prevent possible ignition, for example, when the engine backfires, of the fumes in region 8 of tank 2. The details of carburation 18 are generally indicated in FIG. 2, subsequently described. As with any carburation devices, its main function is to mix a suitable amount of air with the vaporized gasoline to achieve complete and adequate combustion.

In accordance with one embodiment of the invention, a turbine device 21 is interposed in the path of vapor tube 17. Gasoline vapor will be sucked through tube 17 by the carburation device 18 as a result of vacuum created in the intake manifold of engine 3. A rotor of turbine 21 can be utilized to produce some or all of the power needed to either turn the impeller or centrifugal pump 11 or aid in turning it as indicated by mechanical connection 22.

More work needs to be done on the development of a practical and efficient carburation system, and I am conducting more experimentation in this area. However, in the past, I have devised an experimental carburation device that worked fairly well, as subsequently explained. The device was installed on a 1974 Ford Torino Sedan with a 400 cubic inch V8 engine, and excellent fuel economy was obtained for a system generally similar to the one shown in FIG. 2. Before further discussing the results of these experiments, it will be helpful to first describe the structure shown in FIG. 2.

In FIG. 2, reference numeral 2 again designates the gasoline tank of the vehicle. Reference numeral 11 again designates a centrifugal pump that was included in the device that I built. Liquid gasoline was drawn through inlet tube 8 in the direction of arrow 9. Cavitation was produced by the impeller of pump 11 within its housing, and gasoline foam, including a large amount of pure gasoline vapor, was fed back into the upper portion 8 of tank 2 through tube 12, as indicated by arrow 13. A vapor tube 17 in communication with the upper region 8 of gasoline tank 6 conducted gasoline vapor in the direction of arrows 19 through a one-way check valve 20 to the carburation apparatus 18. Reference numeral 24 designates a conventional liquid fuel tank line running from the lower portion of gasoline tank 7 into the original equipment carburetor system 15 of the automobile. Reference numeral 26 designates the conventional air filter of the automobile.

A mixing chamber device 27 was disposed between the intake opening of intake manifold 28. Mixing chamber 27 has an inlet to which tube 17 was connected, so that the gasoline vapor passes into the mixing chamber. An air inlet tube 29 is connected to another inlet of mixing chamber 27. A control valve 30 was connected in series communication with tube 29, and an auxiliary air filter 31 filtered air passing through tube 29 and control valve 30. Control valve 30 performed the function of adjusting the amount of air mixed with gasoline vapor entering mixing chamber 27 via tube 17 in accordance with the operating condition of the engine. Reference numeral 32 indicates the controlled flow of air through tube 29 into mixing chamber 27. Beneath mixing chamber 27 is a housing 33 which is open at its top and bottom to provide a patch of flow for properly mixed gasoline vapor and air in the direction of arrows 34. A butterfly valve 35 was connected by a linkage 36 to the accelerator pedal 37 of the automobile. A further linkage 38 was connected to the throttle lever 39 of standard carburetor 25.

During normal economy operation, the linkage 38 causes the throttle of carburetor 25 to be completely closed, so essentially no air flows through air filter 26 and carburetor 25 into the upper open end of mixing chamber 27. During normal "economy" operation, only gasoline vapor injected into mixing chamber 27 via tube 17 from the upper portion 8 of gasoline tank 2 is fed into the carburation system, and only air from filter 31 and control valve 30 is drawn into the mixing chamber 27 and mixed with the gasoline vapor. Maximum economy of operation occurs in this mode of operation.

My experiments have shown, at least for the embodiments of the invention that I have built so far, that acceleration is quite poor. Therefore, the above-described mode of operation is suitable for fairly level highway driving. However, when more power is needed for acceleration or climbing a steep hill, the throttle linkages 36 and 38 cooperate to open the throttle of carburetor 25 when accelerator pedal 37 is pushed more than halfway to the floor. Then, liquid gasoline is drawn through line 24 into carburetor 25 and supplemental air is drawn through filter 26, and a mixture of that air and partially vaporized gasoline is also conducted into the carburation system. This mixture of air and partially vaporized gasoline supplements that entering mixing chamber 27 through tubes 17 and 29, resulting in a temporary loss of economical operation, and a temporary increase of power.

The carburetor 25, mixing chamber 27, and throttle valve 35 and 39 are shown in more detail in FIGS. 3 and 3A, wherein reference numeral 25 designates the standard, original equipment carburetor of the automobile engine. It includes a throttle 39 which is normally coupled by a suitable linkage to the accelerator pedal, controlling the amount of air 61 drawn through the throat of the carburetor. Reference numeral 27 again designates the mixing chamber of the present invention which is disposed between the base of carburetor 25 and the inlet of input manifold 28. Outside air drawn into mixing chamber 27, as a result of suction from input manifold 28, through filter 31 and control valve 30 (FIG. 2) and flows through tube 29 into the interior of mixing chamber 27. Tube 17 brings completely vaporized gasoline from the vaporization mechanism (which can be the cavitation pump 11 of FIGS. 1 and 2 or other suitable vaporization devices) and the interior 8 of fuel reservoir 2, through the check valve 20 into the interior of mixing chamber 27, wherein the outside air and the completely vaporized gasoline are mixed, if a second lower throttle valve 35 is open. If lower throttle valve 35 is open it allows suction in the intake manifold to draw air through tube 29 and to draw gasoline vapor through tube 17. The mixing of the outside air from tube 29 and the gasoline vapor from the tube 17 is indicated by the arrows in the interior 27A of mixing chamber 27 in FIG. 3A. The mixing chamber and/or the carburetor can be heated by means of hot exhaust fed through a tube such as 63 in FIG. 1 to a heating passage 64 in the mixing chamber 27.

In accordance with the present invention, normally the carburetor throttle valve 39 is closed, allowing only a minute amount of air and partially vaporized gasoline, including a mixture of liquid gasoline droplets, to enter into the upper opening of mixing chamber 27. The original linkage between carburetor throttle valve 39 and the accelerator pedal 37 (FIG. 2) of the automobile is interrupted by the linkage shown in FIGS. 4A–4C, which initially causes only throttle valve 35 to open in response to initial depression of accelerator pedal 37, and allows carburetor throttle valve 39 to remain closed.

This arrangement allows the automobile to operate almost completely on entirely vaporized gasoline for low engine loading conditions, such as traveling at a constant rate of speed on a relatively level highway. However, if a heavier engine loading condition occurs, for example if it is necessary to depress the accelerator further in order to cause the automobile to accelerate rapidly or to climb a steep hill, the further depression of the accelerator pedal 37 not only opens throttle valve 35 further, but also causes carburetor throttle valve 39 to open, so that the mixture of outside air, partially vaporized gasoline, and a mist of gasoline droplets produced by carburetor 25 also enters into the interior of mixing chamber 27 and is mixed with gasoline vapor and air entering through tubes 17 and 29, respectively, and passes into the interior of intake manifold 28 and ultimately to the cylinders of the engine, providing a burst of power.

Although the advantages of providing only entirely vaporized gasoline into the intake manifold are lost during heavy engine loading conditions, the high degree of engine responsiveness and high power that normally are achieved with ordinary carburation techniques are retained, which for low and medium engine loading conditions, the advantages associated with admitting only entirely vaporized gasoline into the intake manifold are obtained by the above-described arrangement.

Turning now to FIGS. 4A–4C, the linkage required for proper operation of throttle valves 39 and 35 is schematically indicated. In FIG. 4A, reference numeral 50 designates the housing of the accelerator cable, and reference numeral 49 designates the inner cable member of the accelerator cable assembly. When the accelerator pedal 37 is depressed, the cable element 49 moves in the direction indicated by arrow 54, causing arm 45, which is rigidly attached to throttle valve 35, to cause rotation of throttle valve 35 in the direction indicated by arrow 56. Arm 51, or a functionally equivalent structure, also rotates, as indicated by arrow 57. An upper arm 52 moves in the direction indicated by arrow 55, and passes slidably through an aperture in arm 48, which is rigidly attached to throttle valve 39. An adjustable retaining nut 53 is provided on the left end of arm 52, so that if arm 51 rotates far enough in the direction of arrow 57, retaining nut 53 will engage arm 48, causing it to rotate as the accelerator pedal 37 is depressed further. Arm 47, which is rigidly attached to throttle valve 39, is connected to the upper end of a spring 46, the lower end of which is connected to the outer end of arm 45.

Referring now to FIG. 4B, the configuration of the throttle linkage is shown when the accelerator pedal 37 is depressed just far enough to open throttle valve 35 in the direction of arrow 56 a predetermined amount, for example to a three-fourths open configuration. At this point, the upper throttle valve 39 remains essentially closed, and retaining nut 53 abuts the upper end of arm 48. The lower end of spring 46 has been raised somewhat, as indicated by arrow 57A, relieving the tension of spring 46 somewhat, making it easier for throttle valve 39 to be opened by further depression of accelerator pedal 37.

Referring now to FIG. 4C, further depression of the accelerator pedal 37 causes arm 51 to rotate further in the direction of arrow 57, which now causes arm 48 to rotate further in the direction of arrow 55A, opening carburetor throttle valve 39 in the direction of arrow 58 and admitting a substantial charge of liquid and vaporized gasoline and outside air and producing a sudden increase in the power output of the engine.

My experiments indicate that the above-described system should result in at least a 100% increase in the fuel economy under driving conditions in which the throttle of the conventional carburetor remains closed. The amount of carbon monoxide produced in the exhaust is significantly reduced when only completely vaporized gasoline is mixed in the proper portion with fresh air, and the engine operating temperature is reduced somewhat. Although some thickening of the liquid gasoline in tank 2 occurs since not all of the constituents of the liquid gasoline are vaporized at the same rate, this thickening normally does not cause any problem, since during acceleration and high load driving conditions, liquid gasoline is also used by the conventional carburetor, even if it is slightly thickened.

Further in accordance with the present invention, an adjustable nut 59 is provided on arm 52, as indicated in FIGS. 4A–4C for the purpose of enabling carburetor throttle valve 39 to open during cold engine starting and cold engine running conditions. The manner in which nut 59 of the linkage operates to allow cold engine starting and running is best understood with reference to FIGS. 5A–5C. In FIGS. 5A–5C, a conventional automatic choke 39A is shown at the upper end of conventional carburetor 25. Dotted line 103 designates a conventional linkage between the automatic choke 39A and the carburetor throttle valve 39. Reference numeral 101 designates gasoline in the float valve chamber, which is drawn into the barrel of carburetor 25 through a suitable jet (not shown). The linkage of FIGS. 4A–4C, except for the accelerator cable 49, also is shown.

FIG. 5A shows the configuration of the system when the engine is warm and automatic choke valve 39A is completely open. Under these conditions, the linkage 103 does not affect carburetor throttle valve 39 or mixing chamber throttle valve 35. When the engine idles, air is drawn in through tube 29 and vapor is drawn into mixing chamber 27 through tube 17, as described above.

In FIG. 5B, the configuration of the linkage is shown during normal, low-load driving conditions referred to above with reference to FIG. 4B, wherein the carburetor throttle valve 39 is closed but mixing chamber throttle valve 35 is open, so increased amounts of air and vaporized gasoline are drawn into mixing chamber 27 through tubes 29 and 17, respectively, allowing economical operation of the engine due to combustion only of a mixture of air and completely vaporized gasoline, as previously described.

In FIG. 5C, the same assembly is shown under cold engine starting and cold engine running conditions, when automatic choke valve 39A is closed. The conventional linkage 103 between automatic choke valve 39A and carburetor throttle valve 39 causes throttle valve 39 to open partially, as illustrated. Arm 48 thereby rotates in the direction of arrow 55A, abutting nut 59, and thereby forcing arm 51 and mixing chamber throttle valve 35 to rotate in the directions of arrows 57 and 56, respectively, thereby causing mixing chamber throttle valve 35 to be open when the engine is cold.

Thus, when the cold engine is being started and during the warm-up period, an amount of outside air is drawn through the barrel of carburetor 25 as a result of the vacuum in the intake manifold 28 (FIG. 3) to which mixing chamber 27 is attached. This can occur because both carburetor throttle valve 39 and mixing chamber throttle valve 35 are open, and the "rich" mixture produced as a result of automatic choke valve 39A being closed is drawn into the intake manifold and cylinders of the engine.

It can be seen that if adjustable nut 59 is not provided on rod 52, arm 52 would not be pushed to the right by arm 48, and the mixing chamber throttle valve 35 would remain closed, preventing a sufficient amount of the "rich" air-gasoline mist from being drawn into the cylinders to effectuate efficient cold engine starting and cold engine running.

While the invention has been described with reference to a particular embodiment thereof, those skilled in the art will be able to provide various modifications to the above-described apparatus and method without departing from the true spirit and scope of the claims.

For example, various other mechanical linkages can be readily devised that will perform essentially the same function as the linkage shown in FIGS. 5A–5C.

I claim:

1. An apparatus for providing a fuel-air mixture to an intake manifold of an internal combustion engine, said apparatus comprising in combination:
   (a) a mixing chamber having first, second, and third inlet ports and an outlet port each in open communication with an interior of the mixing chamber;
   (b) means for attaching the mixing chamber to the intake manifold so that the outlet port of the mixing chamber is attached to an inlet port of the intake manifold, the mixing chamber including a first throttle valve positioned to control flow of gas through the outlet port of the mixing chamber into the intake manifold;
   (c) a carburetor including a second throttle valve, an automatic choke mechanism including both a choke valve and means for partially opening the second throttle valve when the choke valve is closed due to cold engine conditions;

(d) means for partially opening the first throttle valve while maintaining the second throttle valve closed to cause the intake manifold to draw externally vaporized fuel and outside air that does not pass through the carburetor into the interior of the mixing chamber through the second and third inlet ports, allowing mixing of the externally vaporized fuel and outside air, and causing the mixture to pass into the intake manifold while preventing significant amounts of air and fuel mist from the carburetor from passing through the first inlet port into the interior of the mixing chamber to provide economical engine operation under low loading conditions; and (e) means for further opening the first throttle valve and also partially opening the second throttle valve to cause a mixture of air and fuel mist from the carburetor to pass into the mixing chamber, be mixed, and pass into the intake manifold along with the mixture of externally vaporized fuel and outside air to provide increased engine power output.

2. The apparatus of claim 1 further including means for partially opening the first throttle valve in response to partial opening of the second throttle valve by the automatic choke mechanism under cold engine conditions to effectuate passing a rich mixture into the intake manifold to ensure starting of the engine when it is cold.

3. The apparatus of claim 2 including an accelerator linkage connecting an accelerator pedal to the first throttle valve to open the first throttle valve proportionally to an amount of depression of the accelerator pedal through a fixed initial amount of accelerator pedal depression without opening the second throttle valve, the accelerator linkage including means for further opening the second throttle valve proportionally to amounts of further depression of the accelerator pedal and simultaneously further opening the first throttle valve proportionally to such amounts of further depression of the accelerator pedal.

* * * * *